Jan. 17, 1939.   C. HAGEN   2,144,333
PROCESS OF DRYING STARCH
Filed April 8, 1937   2 Sheets-Sheet 1
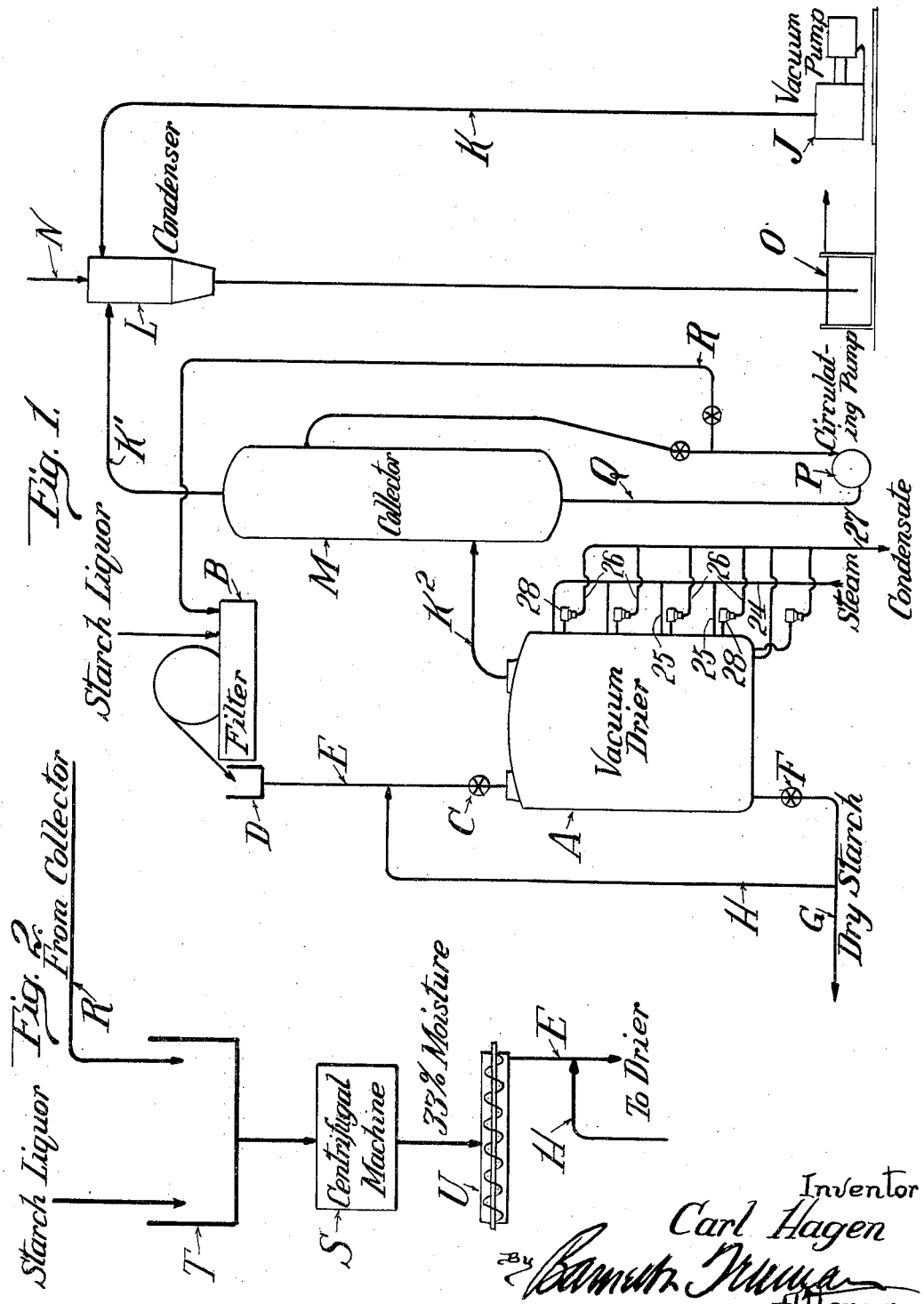

Jan. 17, 1939. C. HAGEN 2,144,333
PROCESS OF DRYING STARCH
Filed April 8, 1937 2 Sheets—Sheet 2
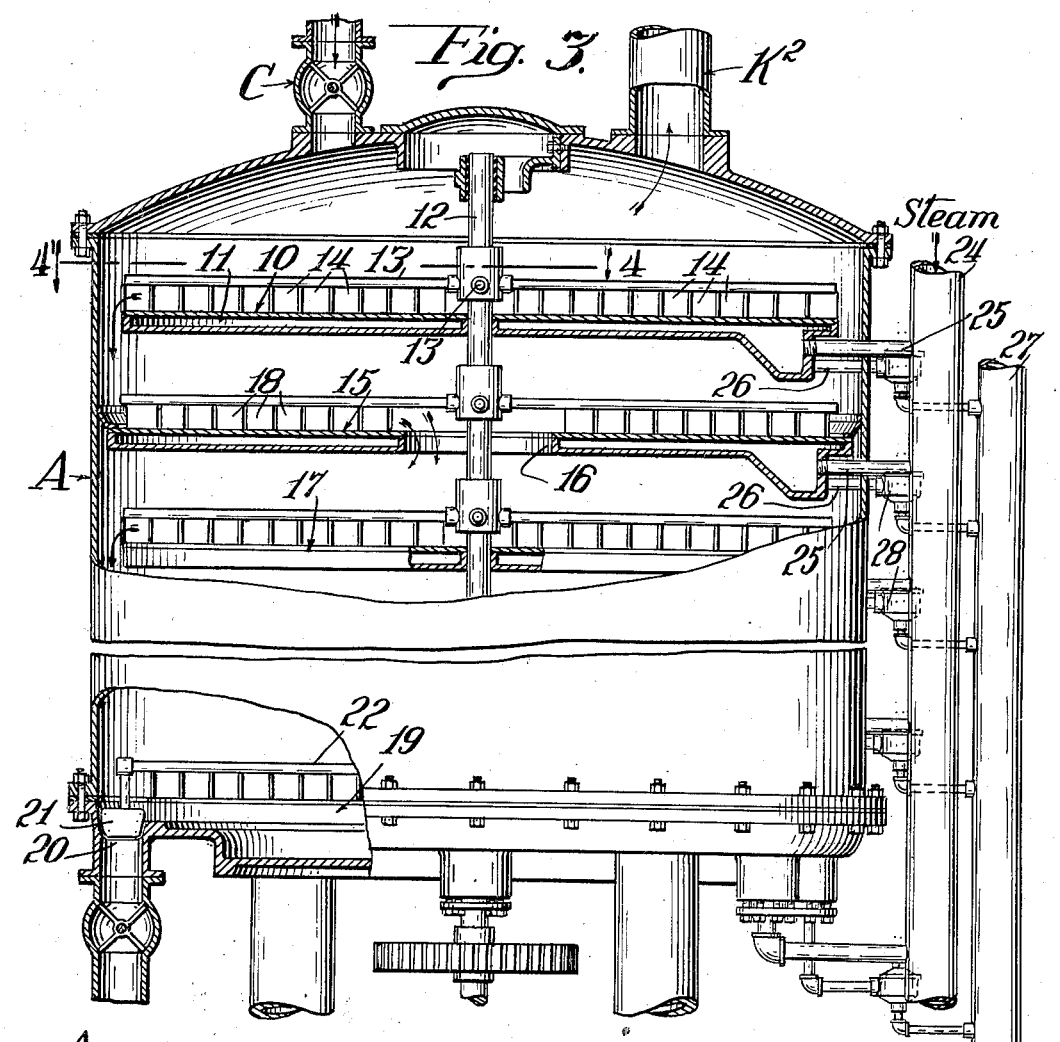
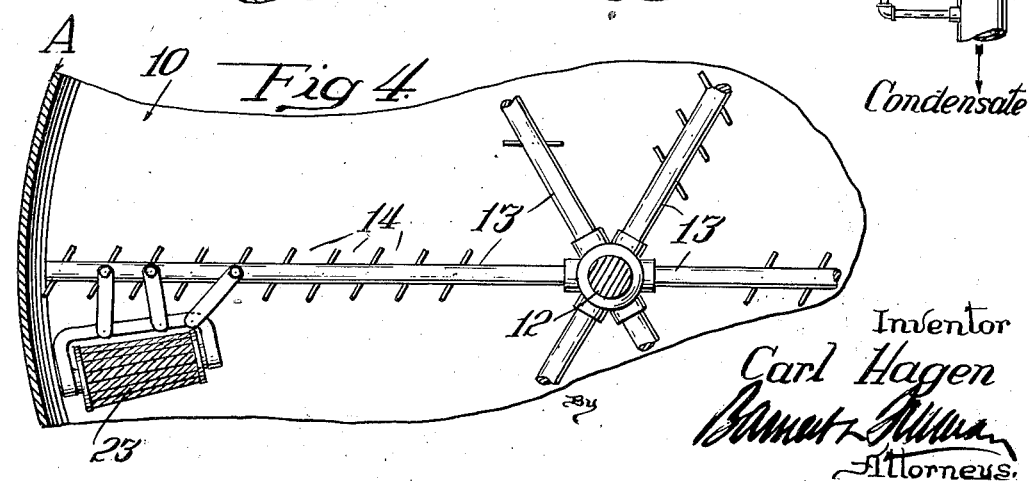
Inventor
Carl Hagen Patented Jan. 17, 1939

2,144,333

UNITED STATES PATENT OFFICE 2,144,333

PROCESS OF DRYING STARCH

Carl Hagen, Park Ridge, Ill., assignor, by mesne assignments, to Corn Products Refining Company, New York, N. Y., a corporation of New Jersey Application April 8, 1937, Serial No. 135,756

4 Claims. (Cl. 34—24)

This invention relates to the drying of starch, and more particularly to the drying of starch, taken from the starch tables or from the filters, or other de-watering and purifying apparatus used for de-watering and/or washing the starch; the starch at these stages of the process being in a solid but moist condition, that is containing, for example, from 30 to 50% of moisture.

One of the objects of the inventioin is to provide a process for drying starch having a moisture content as indicated which will be more convenient and economical than the drying processes now used.

A further object is to provide a drying process in which gelatinization and thinning, that in processes heretofore used takes place to a considerable extent, are minimized, whereby the quality of the starch is improved and the waste of starch incident to the drying process is much reduced.

A further object of the invention is to provide a drying process which, by eliminating the possibilities of contamination by dirt, bacteria and molds, results in commercial starch of higher purity.

A further object of the invention is to provide a process for drying starch which is continuous and of such character as to be better integrated with and fitted into, so to speak, the general continuous, wet process of obtaining starch from corn, or from similar starch bearing materials, than the drying processes heretofore used.

Other incidental objects of the invention will be adverted to in the following description of the preferred processes for carrying out the invention illustrated in the accompanying drawings.

Fig. 1 illustrates in diagram the drying process of the present invention.

Fig. 2 shows a modified arrangement in which a centrifugal machine is substituted for the usual filter for de-watering the starch before it is subjected to the drying operation.

Fig. 3 is a fragmentary, vertical sectional view of the apparatus used for drying the starch; and Fig. 4 is a fragmentary sectional plan on line 4—4 of Fig. 3.

No claim is made herein to the apparatus which is disclosed and claimed in the co-pending application of the applicant, Serial No. 62,625, filed February 6, 1936, which application describes but does not claim the process herein claimed.

The customary way of drying starch at the present time is to load the same into wagons provided either with horizontal trays or with narrow vertical compartments having foraminous walls, and cause these wagons to be moved slowly through long drying kilns or tunnels. This method of drying which has been used for many years and is in use at the present time in a great many starch factories has many disadvantages. The process of drying is difficult to control. It is particularly difficult to dry the starch uniformly. Due to the presence in the starch of residual quantities of sulphur-dioxide, used in the previous steps of the starch making process, the kiln method of drying results in "thinning" the starch, that is modifying it slightly so that it is rendered somewhat more soluble and boils up to a thinner solution. The starch being heated by contact with air over a relatively long period of time, is likely to be contaminated with dirt in the air and subjected to the action of bacteria and molds for the propagation of which the temperature of the kilns is favorable. A certain amount of the starch is lost out of the wagons or is carried away as powder in the air by the air-current passing through the tunnels; and if this starch is recovered it has to be re-processeed. Furthermore, the process is economically inefficient, the steam consumption necessary for keeping up the temperature in the tunnels being very considerable. Finally, considered as a step in the starch making process, the drying operation is not conveniently integrated with the other steps of the process. The drying by the kiln method may require 30 hours. In the case of factory shutdowns, which occur frequently, perhaps once a week, it is necessary either to continue the drying operation after the rest of the process has been stopped or to stop some time in advance of the shut down the delivery of the starch to the kilns, which means keeping the starch in a moist condition on the starch tables and which is not desirable.

The present invention provides a process for drying starch in a vacuum by an operation which requires only a few minutes, about ten minutes, as against thirty hours under the old method; which reduces the tendency of the starch to be thinned in drying; which reduces to a negligible minimum the gelatinization of the starch; which effects an economy of steam and of the labor required for handling the starch; which obviates the necessity of screening the starch after drying, or at least facilitates that operation if used; which eliminates waste and re-processing; and which gives a cleaner, purer starch, having a higher Scott test, that is being thinned less in the drying operation than is the case with kiln-dried starches.

It has been proposed to dry starch in a solid but moist condition in rotary driers, which are loaded and their contents discharged at atmospheric pressure, but, after loading are evacuated and kept at sub-atmospheric pressure during the drying operation. This method, while perhaps used to some extent, has not supplanted the kiln-drying method because of certain inherent disadvantages: the loading at atmospheric pressure tends to bring about gelatinization when the moist starch is brought into contact with the hot surfaces of the drum; unloading at atmospheric pressure results in filling the atmosphere adjacent the driers with starch dust which is both wasteful and dangerous, the latter because of the risk of dust explosion; the operation is a batch operation, and, therefore, interrupts the continuity of the starch making process; the drying is uneven and the dried starch has to be stored in order to equalize moisture.

It has also been proposed to dry in vacuo starch water suspensions without de-watering the starch in a filter or equivalent de-watering device so as to bring it to a solid state; and while this process has been used to some extent, it has the manifest disadvantage of the high cost incident to the evaporation of large quantities of water. Moreover, the starch when dried is in the form of a powder and not in the form of small lumps (pearl starch) which the trade demands. With the drying operation of the present invention the starch produced is pearl starch; the process is brief and continuous and does not prolong materially the starch making process as a whole in the case of shut-downs; there is no objectionable and dangerous discharge of dust into the air; and the wet starch is introduced into the drier while the latter is under vacuum so that one factor tending to bring about gelatinization, i. e., sudden heat application at high temperature, is avoided.

Referring first to Fig. 1 of the drawings, A designates a vacuum drier, the construction of which is shown in some detail in Figs. 3 and 4. B is a starch filter, preferably of the vacuum, displacement type, for de-watering the starch to a moisture content say of 45%. In this condition the starch is introduced into the vacuum drier through a feed valve C. It will be understood that there will be a number of filters operated so as to give a continuous feed of starch to the vacuum drier. D represents the feed trough into which the starch is delivered from the filters, and E a pipe, chute or conveyor from the trough D to feed valve C. The dried starch is discharged continuously from the drier A through valve F and the conduit G. H indicates a pipe from the conduit G to the wet starch line E for mixing a certain amount of dry starch with the wet starch entering the vacuum drier. This facilitates the discharge of the starch from the feed valve.

The vacuum pump is indicated at J and is connected to the upper part of the vacuum drier by line K, K', K² in which line is arranged, preferably, a barometric condenser L and dust collector M. N is the water line leading to the condenser and O the overflow tank of the condenser. The collector M acts as a condenser for the vapors withdrawn from the vacuum drier, the starch liquor (condensate and starch dust) being re-circulated through the collector by pump P in line Q until the liquor reaches a suitable density, say 7°-8° Baumé, after which a sufficient amount is drawn out through line R, to maintain this density, and the starch liquor withdrawn sent back to the process, for example, to filter B.

Referring now to Figs. 3 and 4, the moist starch, with its lumps coated to some extent by the dry starch delivered through line H (Fig. 1), enters the vacuum drier A through the valve C and falls upon a stationary table or drying element 10, consisting of a hollow casting provided with steam ducts 11. A rotating shaft 12 is provided with radial arms 13 for obliquely arranged plows or agitators 14 which are arranged to move the starch across the table I while furrowing the starch layer transversely of the direction of its progressive movement to break it up and continually turn the material over until the outer edge of the table is reached whence the starch is delivered to, that is showered upon, a similar table 15, provided, however, with the discharge opening 16 at the center, through which opening the starch is delivered to a third table 17 like the first mentioned table 10. The plows 18 for table 15 are arranged so as to move the starch inwardly toward discharge opening 16. The drier may be provided with any suitable number of tables or drying elements in alternate arrangement one above the other as described. The dried starch from the last table, designated 19, Fig. 3, passes into a trough 20 from which it is delivered, by means of a paddle 21 on the plow carrying structure 22, to the discharge valve F referred to above.

In order to break up lumps and reduce the starch to the "pearl" stage above mentioned the rotating arm 13 for table 10 carries a conical roller 23, loosely mounted on the arm (Fig. 4) so that it will ride over the starch. The other tables may be provided with similar crushing devices.

Steam is supplied to the tables from a header 24 and branch pipes 25. The condensate from the steam spaces in the tables passes through ducts 26 into a header 27, the ducts 26 being preferably provided with steam traps 28.

Instead of using a filter for the preliminary de-watering of the starch a centrifugal machine may be employed as shown in Fig. 2, in which the centrifugal machine is designated S, the supply tank for the centrifugal T and the conveyor for receiving the de-watered starch from the centrifugal U.

There are advantages in using the centrifugal machine in place of the filter. It is possible to extract more water from the starch with a centrifugal machine than with the ordinary vacuum filter. The starch in fact can be de-watered to 33% moisture, more or less, and this results in more economical operation of the vacuum drier.

The operation of the process may be summarized as follows: while the process could be operated at different sub-atmospheric pressures, it is desirable for reasons of economy, and in order to minimize gelatinization and thinning, to operate it at as high a vacuum as possible. Actually the process has been carried out at a vacuum of 27–28 inches of mercury. This gives a very rapid evaporation of the water from the starch, making it possible to use high temperature steam for the drying tables, for example, steam at a pressure of 15–20 pounds per square inch. This would give a superficial temperature to the upper surfaces of the tables considerably in excess of the gelatinizing temperature of the starch, at least in the case of the upper tables; but the superficial temperature of the tables, at their upper surfaces is very much reduced by the rapid evaporation which takes place due to the high vacuum. As the starch progresses from the upper to the lower tables the evaporation is less, that is the table temperatures are higher, but this does not bring about gelatinization, if the steam temperature and vacuum properly be regulated, because of the decreased tendency to gelatinization due to decreased moisture content of the starch at the lower levels.

The vapors generated are drawn off from the top of the drier, the circulation of vapors being, therefore, in an upward direction. The vapors necessarily follow a zig-zag path inwardly over one table and outwardly over the next and so on. The under surface of the tables are, of course, at a much higher temperature than the upper surfaces which latter are cooled by evaporation, so that the vapors by passing in contact with the under surfaces of the tables are rapidly re-heated to compensate for their loss of heat through contact with the starch moving across the tables and the starch showered from table to table. In fact, the vapors are superheated to the extent of approximately 10° F. As a result of this re-heating condensation of the vapors is prevented. This is very important since drops of condensate on the starch would result in lumping and gelatinization. The superheated vapors are utilized in drying the starch by being passed over the starch on the tables and, particularly, by passing through the starch as it falls from level to level.

The starch in being moved over the tables by the plows is agitated and turned over, to a greater or less extent, so that the heating is uniform throughout the body of starch being treated. Any lumps are disintegrated by the rollers 23.

It will be understood that gelatinization, if it occurs in the drying of starch, is due to overheating in the presence of moisture of certain particles or lumps in comparison to the rest of the starch. The same causes bring about the thinning of the starch. If the starch is overheated in certain regions, the smaller particles are modified, producing thinning, while the lumps are gelatinized. In any event uniform distribution of the heat and proportioning of the heat in respect to water content prevents both gelatinization and thinning.

It is the intention to cover all equivalents of the process steps described and all modifications of the process which are within the scope of the appended claims.

I claim:

1. Method of treating starch in a moist but solid state which comprises: continuously introducing the starch into the upper part of an evacuated space divided, by horizontal drying elements the upper and lower surfaces of which are kept hot, so as to form a series of passageways relatively low in proportion to their lateral extent through which the starch may be moved alternately in opposite directions, falling from level to level as it progresses downwardly through said space; moving the starch through said passageways and at the same time plowing the layers of starch on the heating elements in furrows so as to keep the material constantly in the process of being turned over and agitated; continuously discharging the dried starch from the lower part of said space; and continuously evacuating the said space from the upper end thereof so as to cause the vapors from the drying operations to pass through said passageways counter to the movement of the starch whereby the vapors are superheated by contact with the undersides of said drying elements, condensation is prevented, and the superheated vapors utilized by passing over and through the starch for drying the same.

2. The process of claim 1 in which the surfaces of the heating elements with which the starch is in contact are substantially above the normal gelatinizing temperature of the starch while the vacuum is maintained high enough to produce such rapid evaporation as to prevent gelatinization.

3. Method of treating starch in a moist but solid state which comprises: continuously introducing the starch into the upper part of an evacuated space divided, by horizontal drying elements the upper and lower surfaces of which are kept hot by continuous and direct application internally of said elements of the heating medium, so as to form a series of passageways relatively low in proportion to their lateral extent through which the starch may be moved alternately in opposite directions, falling from level to level as it progresses downwardly through said space; moving the starch through said passageways and at the same time plowing the layers of starch on the heating elements in furrows so as to keep the material constantly in the process of being turned over and agitated; continuously discharging the dried starch from the lower part of said space; and continuously evacuating the said space from the upper end thereof so as to cause the vapors from the drying operations to pass through said passageways counter to the movement of the starch whereby the vapors are superheated by contact with the undersides of said drying elements, condensation is prevented, and the superheated vapors utilized by passing over and through the starch for drying the same.

4. Method of treating starch in a moist but solid state which comprises: continuously introducing the starch into the upper part of an evacuated space divided, by horizontal drying elements the upper and lower surfaces of which are kept hot, so as to form a series of passageways relatively low in proportion to their lateral extent through which the starch may be moved alternately in opposite directions, falling from level to level as it progresses downwardly through said space; moving the starch through said passageways and at the same time plowing the layers of starch on the heating elements in furrows so as to keep the material constantly in the process of being turned over and agitated, breaking up the lumps formed by the plowing up of the starch so as to reduce the material, when dried, to a pearl starch state; continuously discharging the dried starch from the lower part of said space; and continuously evacuating the said space from the upper end thereof so as to cause the vapors from the drying operations to pass through said passageways counter to the movement of the starch whereby the vapors are superheated by contact with the undersides of said drying elements, condensation is prevented, and the superheated vapors utilized by passing over and through the starch for drying the same.

CARL HAGEN.

CERTIFICATE OF CORRECTION.

Patent No. 2,144,333. January 17, 1939.

CARL HAGEN.

It is hereby certified that error appears in the printed specification of the above numbered patent requiring correction as follows: Page 1, first column, line 9, for "inventioin" read invention; page 3, first column, line 51, for "even" read event; and that the said Letters Patent should be read with this correction therein that the same may conform to the record of the case in the Patent Office.

Signed and sealed this 7th day of March, A. D. 1939.

Henry Van Arsdale.

(Seal) Acting Commissioner of Patents.